United States Patent [19]

Bopp

[11] 4,161,498
[45] Jul. 17, 1979

[54] BLENDS OF LOW MOLECULAR WEIGHT POLYALKYLENE TEREPHTHALATE RESINS AND ORGANOPOLYSILOXANE-POLYCARBONATE BLOCK COPOLYMERS

[75] Inventor: Richard C. Bopp, Ballston Lake, N.Y.

[73] Assignee: General Electric Company, Schenectady, N.Y.

[21] Appl. No.: 868,021

[22] Filed: Jan. 9, 1978

[51] Int. Cl.² .................. C08L 67/02; C08L 69/00; C08L 83/06
[52] U.S. Cl. ................................................. 525/439
[58] Field of Search ............................... 260/824 R

[56] References Cited

U.S. PATENT DOCUMENTS 3,686,355   8/1972   Gaines et al. ............... 260/824 R

FOREIGN PATENT DOCUMENTS 1136490   9/1962   Fed. Rep. of Germany ...... 260/824 R

OTHER PUBLICATIONS

Brandrup, J. et al. *Polymer Handbook* (1966) Interscience Publishers, pp. IV359 & IV361.

*Primary Examiner*—Wilbert J. Briggs, Sr.
*Attorney, Agent, or Firm*—F. Wesley Turner; Joseph T. Cohen; Charles T. Watts

[57] ABSTRACT

A blend comprising a low molecular weight polyalkylene terephthalate resin and an organopolysiloxane-polycarbonate block copolymer having improved impact and heat distortion properties. The polymer blends can be molded or formed into films, sheets, fibers, laminates, or other improved molded articles of manufacture including reinforced articles by conventional techniques.

10 Claims, No Drawings

BLENDS OF LOW MOLECULAR WEIGHT POLYALKYLENE TEREPHTHALATE RESINS AND ORGANOPOLYSILOXANE-POLYCARBONATE BLOCK COPOLYMERS

CROSS REFERENCE TO RELATED APPLICATIONS

This invention is related to subject matter disclosed in the copending U.S. applications Ser. Nos. 868,023, Jan. 13, 1978 867,985, and 869,109, filed on Jan. 9, 1978; Jan. 9, 1978; and respectively. All of the aforesaid applications are assigned to the same assignee of this application. All of the disclosures referenced therein are incorporated herein in their entirety by reference.

BACKGROUND OF THE INVENTION

1. Field of the Invention

This invention relates to improved blends of low molecular weight polyalkylene terephthalate resins and an organopolysiloxane-polycarbonate block copolymer having improved impact and heat distortion properties. The polymer blends can be molded or formed into films, sheets, fibers, laminates, or other improved molded articles of manufacture including reinforced articles by conventional techniques.

2. Description of the Prior Art

LeGrand and Yee recognized—as broadly disclosed in the U.S. patent application Ser. No. (RD-8319)—that certain blends of polyalkylene terephthalate resins and organopolysiloxane-polycarbonate block copolymers have improved mechanical properties including improved heat distortion temperatures and impact values. Although LeGrand et al. generally recognized the improved characteristics associated with polyalkylene terephthalate polysiloxane-polycarbonate block copolymer blends they did not recognize the unexpected improvements associated with nonreinforced blends of low molecular weight polyalkylene terephthlate resins and organopolysiloxane-polycarbonate block copolymers.

DESCRIPTION OF THE INVENTION

This invention embodies nonreinforced blends of low molecular weight polyalkylene terephthalate resins and organopolysiloxane-polycarbonate block copolymers having improved impact and heat distortion properties. The polymer blends can be molded or formed into films, sheets, fibers, laminates, or other improved molded articles of manufacture including reinforced articles by conventional techniques.

Any polyalkylene terephthalate resins can be employed which comprises a low molecular weight poly(1,4-alkylene terephthalate) having repeating units of the general formula

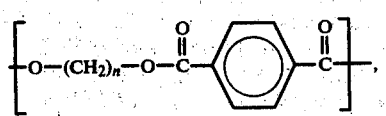

n being a number of from 1 to 50. The poly(1,4-alkylene terephthalate) resins can contain mixtures thereof, including copolyesters, i.e. esters that contain a minor amount, e.g. from about 0.5 to about 2% by weight, of repeating units derived from an aliphatic or another aromatic dicarboxylic acid and/or another aliphatic diol or polyol. Among the units which can be present in the copolyesters are those derived from aliphatic dicarboxylic acids, e.g. acids having up to about 50 carbon atoms, including cycloaliphatic, straight and branched chain acids, such as adipic acid, cyclohexanediacetic acid, dimerized $C_{16-18}$ unsaturated acids (which have 32 to 36 carbon atoms), trimerized such acids, and the like. Among the units in the copolyesters can also be minor amounts derived from aromatic dicarboxylic acids, e.g. acids having up to about 36 carbon atoms, such as isophthalic acid and the like. In addition to the PBT units derived from 1,4-butylene glycol, there can also be minor amounts of units derived from other aliphatic glycols and polyols e.g. di- and polyols having up to about 50 carbon atoms, including ethylene glycol, propylene glycol, cyclohexanediol, and the like. Such copolyesters can be made by techniques well known to those skilled in the art including techniques taught by Winfield et al., U.S. Pat. No. 2,465,319; Pengilly, U.S. Pat. No. 3,047,539, among others.

Illustratively, presently preferred PBT resin blend components have an intrinsic viscosity of from about 0.2 to about 1.0 deciliters per gram as measured in o-chlorophenol, a 60/40 phenol-tetrachloroethane mixture or a similar solvent at 25°–30° C.

Any of the organopolysiloxane-polycarbonate block copolymers disclosed in LeGrand et al.'s copending U.S. patent application RD-8319, referenced herein, can be employed in preparing the improved blends of this invention.

The "organopolysiloxane-polycarbonate block copolymer" can be any copolymer comprising organopolysiloxane-polycarbonate blocks having repeating units of the general formulae:

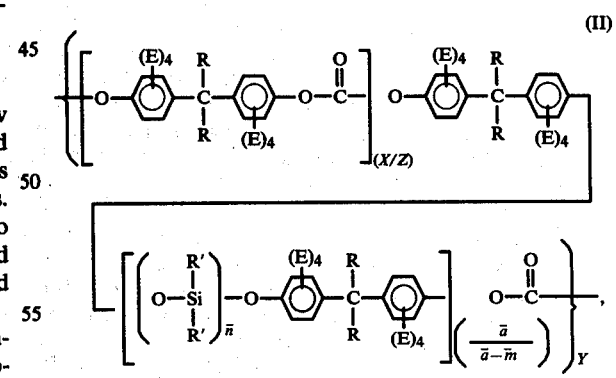

where X is an integer equal to 1 to 1000, inclusive, preferably 2 to 100, $\bar{n}$ is a number average equal to 1 to 100, inclusive, preferably 5 to 40, $\bar{a}$ is a number average equal to 1.1 to 100, $\bar{m}$ is equal to 1, and Z is an integer equal to 1 to 1000, inclusive, preferably 5 to 12, E, R, and R' being as defined hereinafter.

Illustrative of well known organopolysiloxane-polycarbonates are described by the following general formulae:

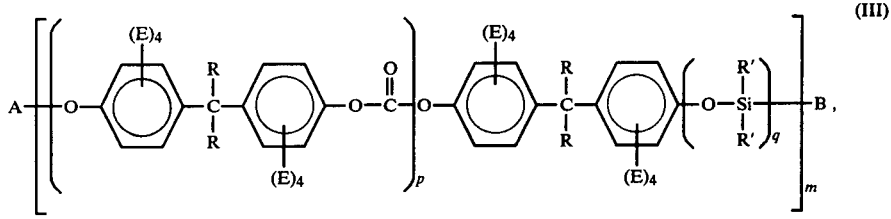

where m is at least 1, and preferably m is an integer equal to from 1 to about 1,000, inclusive, p is equal to from 1 to about 200, inclusive, q is equal to from about 5 to about 200, inclusive, and preferably q has an average value from about 10 to about 90, inclusive, while the ratio of p to q can vary from about 0.005 to about 40, inclusive. B is

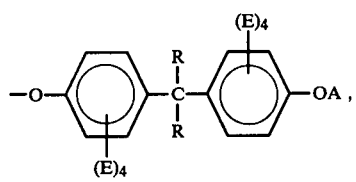

A is a member selected from the class of hydrogen and

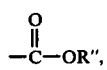

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals and cyanoalkyl radicals, R'' is a member selected from the class consisting of monovalent hydrocarbon radicals and halogenated hydrocarbon radicals, and E is a member selected from the class of hydrogen, lower alkyl radicals and halogen radicals and mixtures thereof.

Included within the radicals represented by R of Formulas II and III are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl propyl, chlorobutyl, cyclohexyl, etc.; R can be all the same radical or any two or more of the aforementioned radicals, while R is preferably methyl, R' includes all radicals included by R above except hydrogen, where R' also can be all the same radical or any two or more of the aforementioned R radicals except hydrogen and R' is preferably methyl. R' also includes, in addition to all the radicals included by R, except hydrogen, cyanoalkyl radicals such as cyanoethyl, cyanobutyl, etc. radicals. Radicals that are included within the definition of E of Formulas II and III are hydrogen, methyl, ethyl, propyl, chloro, bromo, iodo, etc. and combinations thereof, and E is preferably hydrogen.

The organopolysiloxane-polycarbonate block copolymers can be made by any technique known to those skilled in the art including the techniques described by Merritt, Merritt, Jr., et al., and Vaughn Jr. in the U.S. patents referenced in the description of the prior art hereinbefore. Accordingly, all of the procedures described in the aforesaid patents relating to methods for the preparation of the organopolysiloxane-polycarbonate block copolymers are incorporated herein in their entirety by reference.

Illustratively presently preferred organopolysiloxane-polycarbonate block copolymers contain repeating units of Formula II, set out herein before wherein X, Y. Z, $\bar{a}$, $\bar{n}$ and $\bar{m}$ are as defined hereafter:

RESIN TYPE "A"

X equals ~7
Y equals ~8 to 10
Z equals ~1
$\bar{a}$ equals ~2
$\bar{n}$ equals ~10
$\bar{m}$ equals ~1

RESIN TYPE "B"

X equals ~10
Y equals ~8 to 10
Z equals ~1
$\bar{a}$ equals ~2
$\bar{n}$ equals ~20
$\bar{m}$ equals ~1

RESIN TYPE "C"

X equals ~5
Y equals ~8 to 10
Z equals ~1
$\bar{a}$ equals ~2
$\bar{n}$ equals ~20
$\bar{m}$ equals ~1

Blends of polyalkylene terephthalate resins and organo polysiloxane-polycarbonate block copolymers comprise blends of any proportion of the aforesaid resins and copolymers. In general, the presently preferred blend contains at least one percent of an organopolysiloxane-polycarbonate block copolymer. Even more preferably are compositions wherein the organopolysiloxane-polycarbonate block copolymer component is present in an amount of at least about 2-50 percent, and more preferably from about 5-30 percent by weight of the composition.

Since the relative proportions of organopolysiloxane-polycarbonate block copolymers relative to the polyalkylene terephthalate resin effect the physical characteristics of the composition—of the heat distortion temperature as well as the impact properties, the preferred range as set out above have been elected since optimum heat distortion and impact properties are generally obtained within the preferred proportions noted above.

The compositions of this invention comprise polyalkylene terephthalate resin and an organopolysiloxane-polycarbonate block copolymer blends which are substantially free of any reinforcing amount of any reinforcing filler. In general, "reinforcing fillers" are defined herein as any filler which adds to the strength, stiffness and impact strength of the polymer blends. Fillers which do not add strength, etc. to the blends are defined herein as "extending fillers", i.e. "nonreinforcing filler" by definition as contemplated herein. Illustrative reinforcing fillers include e.g. fibers, whiskers, or platelets of metals, e.g. aluminum, iron or nickel and the like, and nonmetals, e.g. ceramics, carbon filaments, silicates, asbestos, titanium dioxide and titanate whiskers, quartz or glass flakes and fibers and the like.

Any of the methods well-known to the art can be employed in the preparation of the compositions of this invention. Illustrative techniques include mixing of a polyalkylene terephthalate (PAT) resin and an organopolysiloxane-polycarbonate block copolymer (PS-PC) in powder or granular form, followed by extrusion, shaping, etc., into pellets or other suitable forms. Any nonreinforcing agent or any other additive can be added to the PAT and PS-PC blends in any conventional manner, e.g. dry mixing, hot melt mixing, etc., employing an extruder, a heated mill or any other mixing device, such as a Banbury mixer.

The compositions can be molded with any equipment conventionally used for unreinforced or reinforced thermoplastic compositions. For example, good results can be obtained using conventional molding machines, which employ plungers or reciprocating-screws, etc., conventional molding temperatures, e.g. about 450°-500° F., and conventional mold temperatures, e.g. 150° F.

In order that those skilled in the art may better understand my invention, the following examples are given which are illustrative of the best mode of this invention, however, these examples are not intended to limit the invention in any manner whatsoever. In the examples, the compositions were prepared in accordance with the following general procedure.

GENERAL PROCEDURE

A series of blends were prepared from commercially available materials comprising (A) poly(1,4-butylene terephthalate) having an intrinsic viscosity of 0.93 dl./g., measured at 25° C. in hexafluoroisopropanol, and (B) an organopolysiloxane-polycarbonate block copolymers having an intrinsic viscosity values within the range of about 0.6 to 1.5 dl./g. or greater measured at 25° C. in chloroform, by dry blending and precompounding a PBT and a PS-PC in a hot melt extruder. The extrudates were pelletized. For comparative purposes, compositions containing only poly(1,4-butylene terephthalate) were also prepared in pellet form. The resin and copolymer blends and control compositions were separately molded into appropriate test shapes, e.g. bars, rods, etc.

EXAMPLE I

Several combinations of polybutylene terephthalate and polysilicone-polycarbonate block copolymer unreinforced (free of many glass fibers) were blended at 500° F. in a one-inch diameter Wayne single screw extruder with a 25:1 1/d fitted with a 3:1 compression screw. The blends were extruded at a rate of 4 to 6 kilograms per hour. The extruded blends were injection molded under nominally identical conditions. After drying at 125° C. for 3-6 hours, the blends were plasticized at 500° F. and injected into appropriate mold cavities at 150° F. A summary of the mechanical properties of the blends with the proportions of the polybutylene terephthalate and polysilicone-polycarbonate block copolymer are set out in Table I which follows:

TABLE I

Properties of Low Molecular Weight Polybutylene Terephthalate Modified With Polysiloxane-Polycarbonate Block Copolymer Resins

| Run No. | COMPOSITION Unfilled(a) | Notched (ft lbs/in) | Unnotched (ft lbs/in) | Tensile Yield Stress (psi) | Properties Ultimate Elongation (%) | Flexural Modulus (psi) | Properties Yield Strength (psi) | HDT at 264 psi As Molded (°F.) |
|---|---|---|---|---|---|---|---|---|
| 1. | 0 % LR-Control | 0.55 | >32 | 7460 | 61.2 | 378,000 | 14,100 | 142 |
| 2. | 10 % LR-3320 | 1.21 | 21.8 | 6200 | 35.5 | 309,000 | 11,700 | 131 |

(a)Unfilled = no fiber glass reinforcement
*Blend containing LR-3320 (polysiloxane-polycarbonate block copolymer) ~ Resin Type "A"

The nonreinforced polyalkylene terephthalate resin and organopolysiloxane-polycarbonate block copolymer blends can be injection, compression and transfer molded into various shaped articles of manufacture, e.g. automotive and appliance utilized articles, extruded to produce films, and other forms having complicated cross-sections as well as cross head extruded hoses, wires, cables and other substrate covers.

I claim:

1. An improved high impact nonreinforced blend comprising a low molecular weight polyalkylene terephthalate resin having an intrinsic viscosity range of from about 0.2 to about 1.0 dl./g. and an organopolysiloxane-polycarbonate block copolymer, subject to the proviso that the blend has an impact value greater than the impact value of the polyalkylene terephthalate resin component of the blend.

2. A claim 1 composition wherein, on a weight basis, a ratio of said resin to said copolymer is 99:1 to 1:99.

3. A claim 2 composition wherein said ratio is from 99:2 to 50:50.

4. The claim 3 composition wherein said ratio is from 95:5 to 70:30.

5. The claim 4 composition wherein the notched Izod impact of the blend is at least 200 percent greater than that of said polyalkylene terephthalate resin.

6. The claim 1 composition wherein said resin is of the formula:

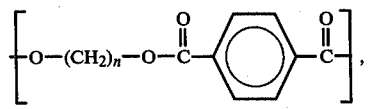

n being a number of from 1 to 50, and said resin has an intrinsic viscosity of from about 0.2 to about 1.0 dl./g.

7. The claim 1 composition wherein said organopolysiloxane-polycarbonate block copolymer is of the formula:

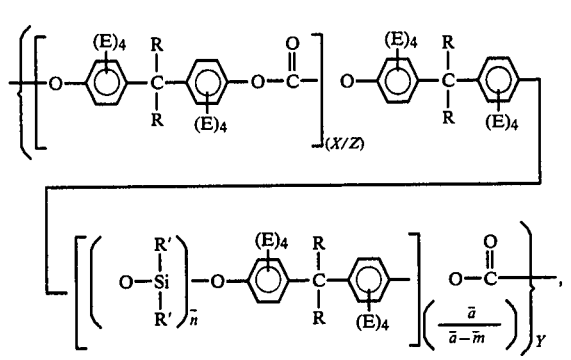

where X is an integer equal to 1 to 1000, inclusive, preferably 2 to 100, $\bar{n}$ is a number average equal to 1 to 100, inclusive, preferably 5 to 40, $\bar{a}$ is a number average equal to 1.1 to 100, $\bar{m}$ is equal to 1, and Z is an integer equal to 1 to 1000, inclusive, preferably 5 to 12, E is a member selected from the class of hydrogen, lower alkyl radicals and halogen radicals and mixtures thereof, R is a member selected from the class of hydrogen, monovalent hydrocarbon radicals and halogenated monovalent hydrocarbon radicals, and R' is a member selected from the class of monovalent hydrocarbon radicals, halogenated monovalent hydrocarbon radicals and cyanoalkyl radicals.

8. The claim 7 composition wherein said copolymer is of the formula:

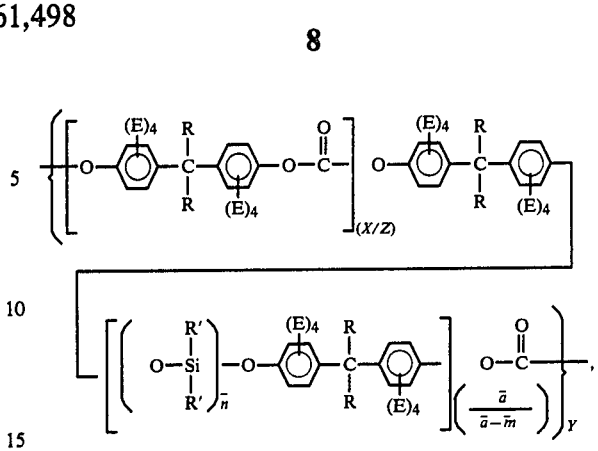

wherein X is an integer equal to 1 to 1000, inclusive, preferably 2 to 100, $\bar{n}$ is a number average equal to 1 to 100, inclusive, preferably 5 to 40, $\bar{a}$ is a number average equal to 1.1 to 100, $\bar{m}$ is equal to 1, and Z is an integer equal to 1 to 1000, inclusive, preferably 5 to 12. E is a member selected from the class of hydrogen, lower alkyl radicals and halogen radicals and mixtures thereof, R is a member selected from the class of hydrogen, monovalent hydrocarbon radicals and halogenated monovalent hydrocarbon radicals, and R' is a member selected from the class of monovalent hydrocarbon radicals, halogenated monovalent hydrocarbon radicals and cyanoalkyl radicals.

9. The claim 7 blend wherein X equals ~7; Y equals ~8 to 10; Z equals ~1; $\bar{a}$ equals ~2; $\bar{n}$ equals ~10; and $\bar{m}$ equals ~1.

10. The claim 7 blend wherein X equals ~10; Y equals ~8 to 10; Z equals ~1; $\bar{a}$ equals ~2; $\bar{n}$ equals ~20; and $\bar{m}$ equals ~1.

* * * * *